United States Patent
Geibel et al.

(10) Patent No.: US 8,062,157 B2
(45) Date of Patent: Nov. 22, 2011

(54) TENSIONER WITH AN ADJUSTER

(75) Inventors: Henning Geibel, Wessling (DE);
Sandra Ketterl, Moosinning (DE);
Martin Bodensteiner, Munich (DE)

(73) Assignee: Iwis Motorsysteme GmbH & Co. KG, Munich (DE)

( * ) Notice: Subject to any disclaimer, the term of this patent is extended or adjusted under 35 U.S.C. 154(b) by 497 days.

(21) Appl. No.: 12/259,610

(22) Filed: Oct. 28, 2008

(65) Prior Publication Data

US 2009/0111627 A1    Apr. 30, 2009

(30) Foreign Application Priority Data

Oct. 30, 2007   (DE) .......... 10 2007 051 824

(51) Int. Cl.
*F16H 7/08* (2006.01)
(52) U.S. Cl. ......... 474/111; 474/101; 474/109; 474/110
(58) Field of Classification Search .................. 474/101, 474/109, 110, 111
See application file for complete search history.

(56) References Cited

U.S. PATENT DOCUMENTS

| | | | | |
|---|---|---|---|---|
| 4,504,251 A | * | 3/1985 | Mittermeier | 474/110 |
| 4,894,047 A | * | 1/1990 | Breon et al. | 474/110 |
| 6,962,241 B2 | | 11/2005 | Ikeda | |

FOREIGN PATENT DOCUMENTS

| | | |
|---|---|---|
| DE | 36 36 918 A1 | 5/1988 |
| DE | 199 29 668 A1 | 1/2001 |
| DE | 100 14 700 B4 | 10/2001 |
| DE | 20 2004 002 705 U1 | 8/2005 |
| EP | 0 657 662 A2 | 6/1995 |
| EP | 1 498 580 A2 | 1/2005 |

* cited by examiner

*Primary Examiner* — Emmanu M Marcelo
(74) *Attorney, Agent, or Firm* — Leydig, Voit & Mayer, Ltd.

(57) ABSTRACT

The present invention relates to a tensioner, in particular a tensioner for a driving chain of an internal combustion engine, comprising a tensioning plunger which is axially movably guided in a plunger bore of a plunger reception means and an adjuster for readjusting the shift of the operating range of the tensioning plunger caused by wear. The adjuster comprises a hydraulic adjusting element and a closable pressure chamber provided on the bottom of the plunger bore. The adjusting element delimits the pressure chamber against the plunger bore and is axially movably guided in said plunger bore.

18 Claims, 1 Drawing Sheet

TENSIONER WITH AN ADJUSTER

The present invention relates to a tensioner, in particular a tensioner for a driving chain of an internal combustion engine, comprising a tensioning plunger which is axially movably guided in a plunger bore of a plunger reception means and an adjuster for readjusting the tensioning plunger e.g. in the case of a shift of the operating range of the plunger caused by wear.

Simple tensioners are widespread and, in particular, they are used as chain tensioners in timing chain drives of internal combustion engines. They normally comprise a housing having arranged therein a hollow-cylindrical tensioning plunger which is pretensioned by means of a pressure spring. Between the tensioning plunger and the plunger bore in the housing a pressure chamber is formed, which can be filled with a hydraulic medium for damping the retracting movement of the tensioning plunger and which has normally also arranged therein the pressure spring. The pressure chamber communicates via a check valve with a hydraulic circuit, e.g. with the engine oil circulation system of the internal combustion engine. The hydraulic medium can escape from the pressure chamber through a throttle opening in the end face of the tensioning plunger or through suitable leak gaps between the plunger and the housing. Such tensioners are normally provided on the return side of the chain drive, since the tension forces occurring there during normal operation are smaller so that the pressure spring only has to be configured according to these smaller tension forces so as to apply a sufficient pretension to the tensioning plunger.

In many cases such tensioners comprise an adjuster causing a readjustment of the tensioning plunger relative to the housing, when the operating range of the plunger shifts due to wear or for some other reason, so as to allow silent starting of an internal combustion engine or so as to prevent the timing chain from tooth jumping. In order to achieve this, an area of the tensioning plunger is normally provided with lateral teeth which cooperate with a ratchet element. The pretensioned ratchet element allows the tensioning plunger to slip through in the pressure direction of the pressure spring and it also prevents an excessive retracting movement of the plunger into the plunger bore of the housing when comparatively hard and forceful vibration impacts occur. Simple embodiments are so conceived that the ratchet element engages the teeth through an opening in the housing, said ratchet element being axially movable in the opening so that the tensioning plunger will be able to move freely in the axial direction within an operating range. A tensioner of this type is known from DE 100 14 700 A1; in the case of this tensioner the spring-biased plunger comprises two substantially opposed ratchet sections which engage the sawtooth profile of the ratchet element through respective openings in the housing.

A similar tensioner is also known from DE 36 36 918 A1. When this tensioner is put into operation for the first time, a locking ring arranged on the tensioning plunger will snap into a first locking position in the inner wall of the tensioner housing. If the damping of the hydraulic medium in the pressure chamber should not suffice for bringing the plunger to a standstill after a large retracting movement, e.g. when the tensioner is put into operation after a standstill or when strong vibration impacts occur, the locking ring will strike against a stop edge of the plunger, whereby the retracting movement of the plunger into the plunger bore will be limited. If, in the case of wear of the drive means, the initial position of the locking ring should no longer suffice to delimit a sufficiently large operating range of the tensioning plunger, the locking ring will be forced into the next locking position of the tensioner housing by a second locking edge in the outer wall of the plunger, whereby the operating range of the tensioning plunger will be shifted in the pressure direction.

Furthermore, there are also tensioners with blocking means which guarantee that, if the pressure in the hydraulic circuit should be insufficient, e.g. when the engine is stopped and started, a locking effect will occur which will prevent the tensioning plunger from moving into the plunger bore. Reference EP 657 662 A2 describes such a tensioner with a tensioning plunger, the outer circumference of this tensioning plunger comprising a plurality of locking grooves engaged by a spring-loaded locking plunger. The front of the locking plunger is bevelled and adapted to be acted upon by the pressure of the hydraulic medium, whereby the locking plunger will be disengaged. In the blocking position of the locking plunger, a certain pretension is maintained by the tensioner, even when the engine is at a standstill, this pretension existing whenever the tensioner is put into operation once more, irrespectively of the pressure prevailing in the pressure chamber or in the hydraulic circuit. As soon as a sufficiently high pressure has built up in the hydraulic circuit and, consequently, also in the pressure chamber, the hydraulic pressure will render the blocking means inoperative and the tensioning plunger will resume its normal operation.

Tensioners with ratchet elements or locking rings for readjusting the shifts of the operating range of the plunger caused by wear as well as for limiting the retracting movement of the tensioning plunger are widespread, especially in internal combustion engines, and have proved their worth in use. Due to the raster, the operating range can only be readjusted in comparatively large steps; in view of the fact that the retracting movement of the tensioning plunger is limited by the adjuster, the actually available operating range of the tensioning plunger will, when the next adjustment step has been reached, gradually decrease until the next slip-through takes place so that the tensioning plunger will more frequently strike against the stop for limiting the retracting movement. Moreover, the respective structural designs of the adjusters are comparatively complicated and difficult to mount, since the adjusters can only be put into operation when the tensioner has been installed. Hence, it is often necessary that the adjusters, which are normally composed of a plurality of components, have to be mounted in a complicated manner and locked at a safe transport and/or mounting position.

In view of the disadvantages of the tensioners known from the prior art, it is therefore the object of the present invention to provide an improved tensioner with an adjuster which avoids or reduces the above-mentioned drawbacks.

According to the present invention, this object is achieved in that the adjuster comprises a hydraulically-aided adjusting element, i.e. the hydraulic adjusting element leans on an hydraulic cushion, and a closable pressure chamber provided on the bottom of the plunger bore, said adjusting element delimiting the pressure chamber against the rest of the plunger bore and being axially movably guided in said plunger bore. An adjuster of this type allows a simple structural design of the adjuster, in spite of a continuous readjustment of the tensioning plunger in response to a shift of the operating range of the plunger caused by wear. As soon as the tensioning plunger moves in the plunger bore beyond the respective operating range of the plunger in the tensioning direction, a coupled movement of the adjusting element can take place simultaneously so that the adjusting element will axially be displaced in the plunger bore. The function of the adjuster is here realized by means of a non-compressible hydraulic medium column so that the hydraulic medium flowing into the pressure chamber in the case of a movement of the adjusting element will prevent a retracting movement in the opposite direction. Due to the continuous readjustment of the tensioner according to the present invention, the rasters which normally exist in the case of readjustments will be avoided so that the magnitude of the operating range of the tensioning plunger will remain independent of the position of the plunger relative to the adjuster. This tensioner allows, in spite of or due to the new kind of adjuster, a free adjustment of the damping function within a limited stroke, as has been common practice in the hitherto known prior art.

A simple embodiment of the tensioner according to the present invention is conceived so that the adjusting element supports the tensioning plunger during a retracting movement into the plunger bore. The fact that the adjusting element supports the tensioning plunger allows a simple structural solution for a direct or indirect transmission of force from the tensioning plunger to the housing of the tensioner. The tensioning plunger is preferably not directly supported by the adjusting element, but it is supported via a pressure spring and/or a hydraulic column. It follows that the adjusting element absorbs the force applied by the tensioning plunger during the plunger retracting movement and the supporting force during the plunger extension movement and transmits this force via the pressure chamber.

One variant of the present invention is conceived so that a check valve is provided, which connects the closable pressure chamber to a hydraulic system and which closes the pressure chamber off from the hydraulic system. The check valve allows a reliable connection between the hydraulic system and the pressure chamber and it e.g. allows to keep the pressure chamber closed, even if pressurized hydraulic medium should not be supplied when an internal combustion engine is at a standstill, and to maintain the adjustment position of the plunger in this way. The check valve can be implemented as a disc-type check valve. The small overall height of a disc-type check valve allows a particularly compact structural design of the tensioner. A seat for receiving the check valve can be provided on the bottom of the plunger bore so that the check valve can be positioned and mounted easily.

One expedient embodiment is conceived so that a sealing element is provided between the adjusting element and the inner wall of the plunger bore, said sealing element being preferably a sealing ring which is arranged in a groove provided in an outer wall of the adjusting element. Such a sealing element prevents leakage of the hydraulic medium from the pressure chamber. This has the effect that, especially during longer downtimes, the hydraulic medium will be maintained without any additional flow occurring from the hydraulic system connected thereto, and that not only the volume but also the pressure of the hydraulic medium will remain substantially constant. For providing an effective tensioning function with a sufficient tensioning force of the plunger, a spring element, preferably a pressure spring, can be provided between the adjusting element and the tensioning plunger. The pressure spring allows a reliable transmission of force from the tensioning plunger to the adjusting element and from said adjusting element also to the housing of the tensioner via the pressure chamber. Alternatively, it will also suffice when the tensioner only comprises a hydraulic column between the tensioning plunger and the adjusting element.

One preferred embodiment is so conceived that the adjusting element and the tensioning plunger are interconnected such that they are axially movable relative to one another. The relative stroke which thus results between the adjusting element and the tensioning plunger defines the operating range of the tensioning plunger obtained without a readjustment of the plunger. An optimum function of the tensioner irrespectively of the position of the adjusting element is achieved in this way. The adjusting element can also be used as a stop for the tensioning plunger in the case of an undesirably strong retracting movement of the plunger. As soon as the tensioning plunger moves further out of the plunger bore beyond the operating range defined by said relative stroke, the plunger will also entrain the adjusting element in the pressure direction so that the operating range of the tensioning plunger relative to the plunger bore will be redefined. When the adjusting element moves in the plunger bore in the direction of pressure, this will also have the effect that the pressure chamber between the bottom of the plunger bore and the adjusting element will increase in size. The hydraulic medium flows into the enlarged volume of the pressure chamber so as to fix the position of the adjusting element even in the case of a strong retracting movement of the plunger.

For easy mounting of the adjusting element and of the tensioning plunger, an outer ring of the adjusting element can be provided with a locking element, preferably one or a plurality of bevelled locking heads, on the end facing the tensioning plunger, said locking element engaging behind a locking element, preferably one or a plurality of bevelled locking heads, arranged on the end of the hollow-cylindrical tensioning plunger facing the adjusting element. The implementation of the adjusting element and/or of the tensioning plunger with radially flexible locking elements with locking heads that face one another allows an extremely easy mounting of the adjusting element, before the plunger is installed, by simple clipping on; nevertheless, it permits a permanent safe limitation of the stroke of the plunger and, by interengagement of the locking heads, the adjusting element can easily be pulled along in the pressure direction.

One advantageous embodiment is so conceived that the plunger reception means is implemented as a tensioner housing and that the pressure chamber defined in the plunger bore between the tensioning plunger and the adjusting element is filled with a hydraulic medium for damping the retracting movement of the tensioning plunger. This allows a simple structural design of a tensioner with a small number of components and a nevertheless reliable function. The tensioner according to the present invention can especially be implemented as a screw-in chain tensioner, which, due to its compact structural design, will be optimal for realizing the solution according to the present invention. In the case of a screw-in chain tensioner, the screw-in thread, the stop and the sealing are integral components of the tensioner housing and allow, in spite of a small number of components, an easy final assembly.

An alternative embodiment is so conceived that the plunger reception means is implemented as a damping plunger, and that the damping plunger is axially movably guided in a bore in a tensioner housing. This special structural design allows a separation of the damping function from the adjuster and, consequently, a finer adjustment between a stroke of the plunger defined under the pretension of the pressure spring and the point where damping of the plunger starts. For providing a sufficiently large volume for the hydraulic medium, a damping pressure chamber can be provided between the hollow-cylindrical damping plunger and the bore in the tensioner housing, said damping pressure chamber being filled with a hydraulic medium for damping the retracting movement of the tensioning plunger.

According to an advantageous embodiment, a damping pressure spring can be provided between the damping plunger and the bore in the tensioner housing so as to improve the damping characteristics. Furthermore, it will be of advantage when a check valve, preferably a ball check valve, is provided, which connects the damping pressure chamber to the hydraulic system. This check valve allows to guarantee the hydraulic pressure in the damping pressure chamber so that there will be a sufficient amount of hydraulic medium with a sufficiently high pressure for damping the tensioner in the damping pressure chamber, even if the pressure in the hydraulic system should drop or if the associated internal combustion engine should stand still.

An expedient embodiment is conceived so that a hydraulic medium chamber is provided in the damping plunger, said hydraulic medium chamber communicating with the check valve leading to the damping pressure chamber as well as with a check valve leading to the closable pressure chamber of the adjuster. Making use of such a hydraulic medium chamber, the damping pressure chamber and the pressure chamber can simultaneously be supplied with a hydraulic medium through one supply volume and, consequently, through a single connection to the hydraulic system.

In view of the fact that, in the case of a plunger reception means implemented as a damping plunger, the damping function of the tensioner is produced by the damping plunger, i.e. the damping pressure chamber defined between the tensioner housing and the damping plunger, the pressure chamber provided between the tensioning plunger and the adjusting element can be filled with air so as to allow a simple structural design of the tensioner so that additional hydraulic medium supply means can here be dispensed with.

In the following, the structural design and the function of the tensioners according to the present invention will be explained in more detail on the basis of various embodiments with reference to the drawings enclosed, in which.

Figure 1:
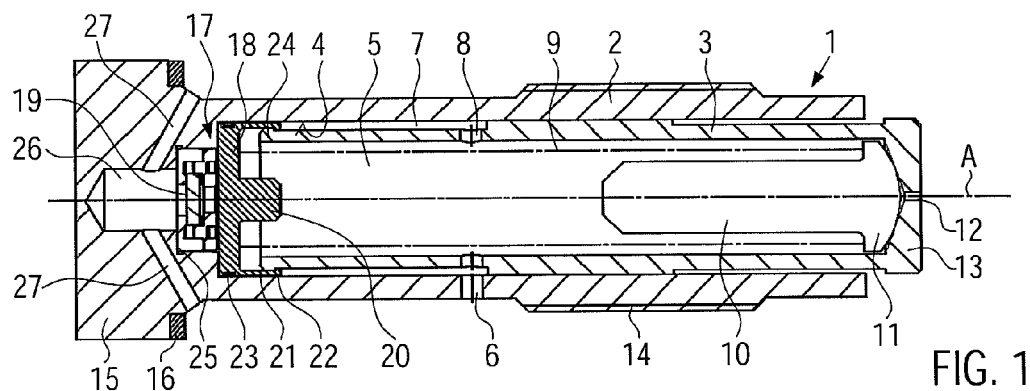
FIG. 1 shows a cross-sectional view through a tensioner with an adjuster according to the present invention.

FIG. 1 shows a tensioner 1 according to the present invention used for a timing chain drive of an internal combustion engine and comprising a hollow-cylindrical housing 2 in which a tensioning plunger 3, which is hollow-cylindrical as well, is guided such that it is longitudinally movable along the axis A in the plunger bore 4 of the housing 2. The tensioner housing 2 and the tensioning plunger 3 define together a pressure chamber 5 supplied with a hydraulic medium, which will normally be the engine oil from the oil circulation system of the internal combustion engine, via an oil supply hole 6 through the housing 2, an oil ring channel 7 extending between the inner wall of the plunger bore 4 of the housing 2 and the outer wall of the tensioning plunger 3 as well as an oil inlet opening 8 in the hollow-cylindrical tensioning plunger 3. The tensioning plunger 3 is axially pretensioned by a helical pressure spring 9 (schematically shown), which is arranged in the pressure chamber 5 and which presses the tensioning plunger 3 in the direction of the axis A against the timing chain (not shown) of an internal combustion engine. In addition, the hollow-cylindrical tensioning plunger 3 has arranged therein a mushroom-shaped hollow body 10, which reduces the volume of the pressure chamber 5 and which simultaneously guides the pressure spring 9, an air vent 12 in the tension-side end face 13 of the tensioning plunger 3 being sealed off from the hydraulic medium-filled pressure chamber 5 in a throttled manner by the head 11 of said mushroom-shaped hollow body 10. For this purpose, the head 11 of the hollow body 10 is pressed by means of the pressure spring 9 against the inner front end of the end face 13 of the tensioning plunger 3. The housing 2 is additionally provided with a threaded section 14 on its outer circumference and with a flange 15 on the foot portion of the housing 2 which faces away from the tensioning plunger 3. Making use of the threaded section 14, the tensioner 1, which is implemented as a screw-in tensioner, can be mounted in the engine block of an internal combustion engine, the flange 15 limiting the screw-in operation of the tensioner 1 and the sealing 16 provided on the flange 15 sealing the tensioner 1 off from the engine block. Alternatively, the tensioner 1 can also be implemented as a flange-type tensioner and the housing 2 can be implemented as a flange-type housing.

The plunger bore 4 of the housing 2 has additionally provided therein the adjuster 17 with a cap-shaped adjusting element 18 and a check valve 19. The pressure spring 9 rests on the adjusting element 18, the side of the adjusting element 18 facing the tensioning plunger 3 having centrally arranged thereon a pin 20 for guiding the pressure spring 9. The side of the adjusting element 18 facing the tensioning plunger 3 has additionally provided thereon a ring 21 which projects in the direction of the axis A; the end of said ring 21 has formed thereon a locking head 22 which is directed inwards, the ring 21 being radially movable, at least in an outward direction. A sealing ring 23 is provided between the outer wall of the adjusting element 18 and the plunger bore 4. The end of the tensioning plunger 3 facing away from the tensioning head 13 has provided thereon at least one, or a plurality of radially outwardly protruding locking heads 24, which cooperate with the locking heads 22 on the ring 21 of the adjusting element 18, i.e. which engage behind these locking heads 22 so that the adjusting element 18 and the tensioning plunger 3 are interconnected under the pretension of the pressure spring 9 such that they are longitudinally movable in the direction of the axis A. The motion play of the tensioning plunger 3 relative to the adjusting element 18 defines the stroke of the tensioning plunger 3 with which said tensioning plunger 3 moves axially without being readjusted. The motion play or stroke of the tensioning plunger 3 is defined between the fully extended position of the tensioning plunger 3, which is a result of the pretension applied by the pressure spring 9 and at which the locking heads 22 of the adjusting element 18 and the at least one locking head 24 of the tensioning plunger 3 are in contact with one another and prevent further extension without an adjustment, i.e. they prevent the adjusting element 18 from axially moving out of the plunger bore 4 still further, and the location where the lower end of the tensioning plunger 3 strikes against the disc-shaped part of the adjusting element 18.

When the tensioner 1 is being assembled during the pre-assembly operation, the adjusting element 18 can very easily be clipped onto the tensioning plunger end facing away from the tensioning head 13 prior to inserting the tensioning plunger 3 into the plunger bore 4, since the locking heads provided on the ring 21 of the adjusting element 18 can be moved radially outwards. Alternatively, also a radially inwardly moving end of the tensioning plunger 3 with the locking heads 24 would be possible so as to allow the adjusting element 18 to be clipped on.

The check valve 19 of the adjuster 17 is preferably implemented as a disc-type check valve, and it is arranged in, preferably pressed into a seat 25 in the housing 2 on the bottom of the plunger bore 4. The check valve 19 additionally delimits, relative to the plunger bore 4, a hydraulic medium chamber 26 on the bottom of the plunger bore 4, said hydraulic medium chamber 26 communicating with the oil-circulation system through two oil inlet openings 27. As soon as, after putting the tensioner 1 into operation, the adjuster 17 has adjusted the operating range of the plunger 3 to the individual mounting conditions through the extension movement of the tensioning plunger 3, a pressure chamber 28 is formed in the plunger bore 4 between the check valve 19 and the adjusting element 18, as can be seen in FIG. 2, said pressure chamber 28 being supplied with pressurized hydraulic medium, which will normally be engine oil in the case of an internal combustion engine, via the hydraulic medium chamber 26 and the check valve 19.

Figure 2:
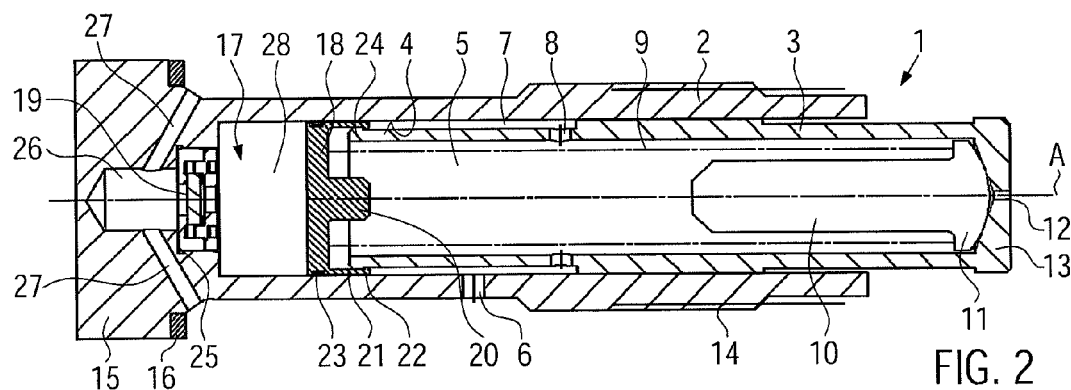
FIG. 2 shows the tensioner according to FIG. 1 with a readjusted tensioning plunger.
Figure 3:
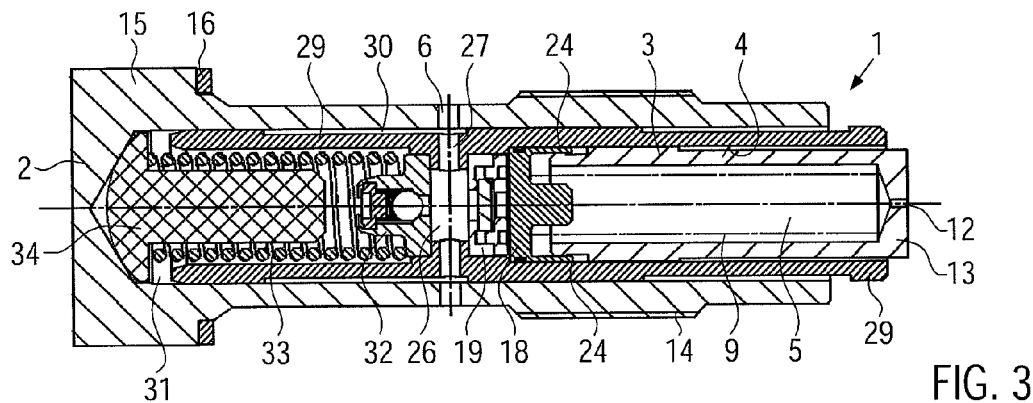
FIG. 3 shows a cross-sectional view of a further embodiment of the tensioner with an adjuster according to the present invention.

FIG. 3 shows a further embodiment of the tensioner according to the present invention; only the essential differences between said further embodiment and the embodiments according to FIGS. 1 and 2 will here be described. As far as identical and similar components are concerned, the above description is referred to. Also in this case, the tensioning plunger 3 is guided in a plunger bore 4 such that it is longitudinally movable along the axis A and it is connected via the locking heads 22, 24 to the adjusting element 18 such that it is movable relative thereto. The check valve 19 of the adjuster 17 is again supplied with a hydraulic medium from a hydraulic medium chamber 26. The plunger bore 4 is here, however, provided in a damping plunger 29 which is again guided in the hollow-cylindrical tensioner housing 2 such that it is longitudinally movable along the axis A. Also in the case of this embodiment, a pressure chamber 5 is formed between the tensioning plunger 3 and the plunger bore 4 in the damping plunger 29, said pressure chamber 5 accommodating the pressure spring 9 (schematically shown). The pressure chamber 5 of this embodiment is filled with air which can flow in and out via the air vent 12 in the end face 13 of the tensioning plunger 3. Oil inlet openings 27 leading to the hydraulic medium chamber 26 communicate with the hydraulic system, i.e. the engine oil circulation system, via an oil ring channel 30 extending between the inner wall of the tensioner housing 2 and the outer wall of the damping plunger 29 and the oil supply openings 6 in the wall of the hollow-cylindrical housing 2.

At the end of the tensioning plunger 3 facing away from the hollow-cylindrical damping plunger 29, a damping pressure chamber 31 is provided between the damping plunger 29 and the tensioner housing 2, said damping pressure chamber 31 being delimited against the hydraulic medium chamber 26, and consequently also against the adjuster 17, by a conventional ball check valve 32. A leak gap for venting the damping pressure chamber 31 can be provided between the damping plunger 29 and the bore in the housing 2. The damping pressure chamber 31 has arranged therein a damping pressure spring 33 and a mushroom-shaped hollow body 34. The hollow body 34 reduces the volume of the damping pressure chamber 31 and its shaft guides the damping pressure spring 33.

Also the embodiment of the tensioner according to the present invention shown in FIG. 3 is preferably implemented as a screw-in tensioner having a threaded section 14 and a flange 15 provided with a sealing 16.

In the following, the mode of operation of the tensioner 1 according to the present invention will be explained in more detail.

The different tensioners 1 shown in FIG. 1 and FIG. 3 are each shown in a mounting position in which the adjusting element 18 abuts on the check valve 19 of the adjuster 17 so that the pressure chamber 28 provided between these two parts of the adjuster 17 has a negligible volume. When these tensioners 1 have been installed in the engine block of an internal combustion engine, the pressure chamber 5 will be filled with hydraulic medium due to the pressure built up when the respective tensioner is put into operation for the first time and the tensioning plunger 3 will be displaced in the direction of the axis A until the timing chain to be tensioned by the tensioner 1 will be under sufficient tension. Simultaneously, the adjusting element 18, which is connected to the tensioning plunger 3, is pulled along in the direction of the axis A. The thus formed pressure chamber 28 of the adjuster 17 is filled with hydraulic medium via the hydraulic medium chamber 26 and the check valve 19. In the subsequent operation, the timing chain (not shown) of an internal combustion engine will be pretensioned to a sufficient extent by the tensioning plunger 3, which is pretensioned by the pressure spring 9, and the tensioning plunger 3 will be able to move within the operating range predetermined by the adjusting element 18 so as to compensate vibrations and impacts by the timing chain.

In the case of the tensioner 1 shown in FIG. 1, the retracting movement of the tensioning plunger 3 is damped by the engine oil contained in the pressure chamber, whereas in the case of the embodiment shown in FIG. 3, the tensioning plunger 3 can move freely in the plunger bore 4 against the pretension applied by the pressure spring 9. In the case of the embodiment of the tensioner 1 according to the present invention shown in FIG. 3, an excessive retracting movement of the tensioning plunger 3 will be damped through the movement of the damping plunger 29 in the tensioner housing 2, said last-mentioned movement being damped by the hydraulic medium in the damping pressure chamber 31. In the case of this embodiment, the pressure chamber 5 of the adjuster 17 and the damping pressure chamber 31 are both supplied by the hydraulic medium chamber 26 so that one connection to the respective hydraulic medium circuit will suffice.

The invention claimed is:

1. A tensioner for a driving chain of an internal combustion engine, comprising a tensioning plunger which is axially movably guided in a plunger bore of a plunger reception means, and an adjuster, wherein said adjuster comprises a hydraulic adjusting element and a closable pressure chamber provided on a bottom of the plunger bore, wherein said adjusting element delimits the closable pressure chamber against the plunger bore and is axially movably guided in said plunger bore, wherein a spring element is provided between the adjusting element and the tensioning plunger.

2. A tensioner according to claim 1, wherein the adjusting element supports the tensioning plunger.

3. A tensioner according to claim 1, wherein a check valve is provided, which connects the closable pressure chamber to a hydraulic system.

4. A tensioner according to claim 3, wherein the check valve is implemented as a disc-type check valve.

5. A tensioner according to claim 1, wherein a sealing element is provided between the adjusting element and an inner wall of the plunger bore.

6. A tensioner according to claim 1, wherein the spring element is a pressure spring.

7. A tensioner according to claim 1, wherein the adjusting element and the tensioning plunger are interconnected such that they are axially movable relative to one another.

8. A tensioner according to claim 7, wherein an outer ring of the adjusting element is provided with a locking element on an end facing the tensioning plunger, said locking element engaging behind a locking element arranged on an end of the tensioning plunger facing the adjusting element.

9. A tensioner according to claim 8, wherein the locking element of the outer ring is implemented as one or as a plurality of bevelled locking heads, and wherein the locking element on the tensioning plunger is implemented as one, or as a plurality of bevelled locking heads.

10. A tensioner according to claim 1, wherein the tensioner is implemented as a screw-in chain tensioner.

11. A tensioner comprising a tensioning plunger which is axially movably guided in a plunger bore of a plunger reception means, said plunger reception means being implemented as a tensioner housing, further comprising an adjuster with a hydraulic adjusting element and a closable pressure chamber provided on a bottom of the plunger bore, said adjusting element delimiting the closable pressure chamber against the plunger bore and being axially movably guided in said plunger bore and a second pressure chamber positioned between the tensioning plunger and the adjusting element, said second pressure chamber being filled with a hydraulic medium for damping the retracting movement of the tensioning plunger, wherein a spring element is provided between the adjusting element and the tensioning plunger.

12. A tensioner comprising a tensioner housing and a tensioning plunger which is axially movably guided in a plunger bore of a damping plunger, said damping plunger being axially movably guided in a bore of the tensioner housing further comprising an adjuster with a hydraulic adjusting element and a closable pressure chamber provided on a bottom of the plunger bore, said adjusting element delimiting the closable pressure chamber against the plunger bore and being axially movably guided in said plunger bore, wherein a spring element is provided between the adjusting element and the tensioning plunger.

13. A tensioner according to claim 12, wherein a damping pressure spring is provided between the damping plunger and the bore in the tensioner housing.

14. A tensioner according to claim 12, wherein a damping pressure chamber is provided between the damping plunger and the bore in the tensioner housing, said damping pressure chamber being filled with a hydraulic medium for damping the retracting movement of the tensioning plunger.

15. A tensioner according to claim 14, wherein a damping check valve is provided, which connects the damping pressure chamber to a hydraulic system.

16. A tensioner according to claim 15, wherein a hydraulic medium chamber is provided in the damping plunger, said hydraulic medium chamber communicating with the damping check valve leading to the damping pressure chamber and with a check valve leading to the closable pressure chamber of the adjuster.

17. A tensioner according to claim 12, wherein a second pressure chamber is provided between the tensioning plunger and the adjusting element.

18. A tensioner according to claim 17, wherein the second pressure chamber provided between the tensioning plunger and the adjusting element is filled with air.

* * * * *